Dec. 10, 1935.                D. F. NEWMAN                         2,023,970
                       PROJECTION SYSTEM AND METHOD
                    Filed Jan. 16, 1932           2 Sheets-Sheet 1

INVENTOR
David F. Newman
BY
Ward, Crosby & Neal
ATTORNEYS

Dec. 10, 1935.   D. F. NEWMAN   2,023,970
PROJECTION SYSTEM AND METHOD
Filed Jan. 16, 1932   2 Sheets-Sheet 2
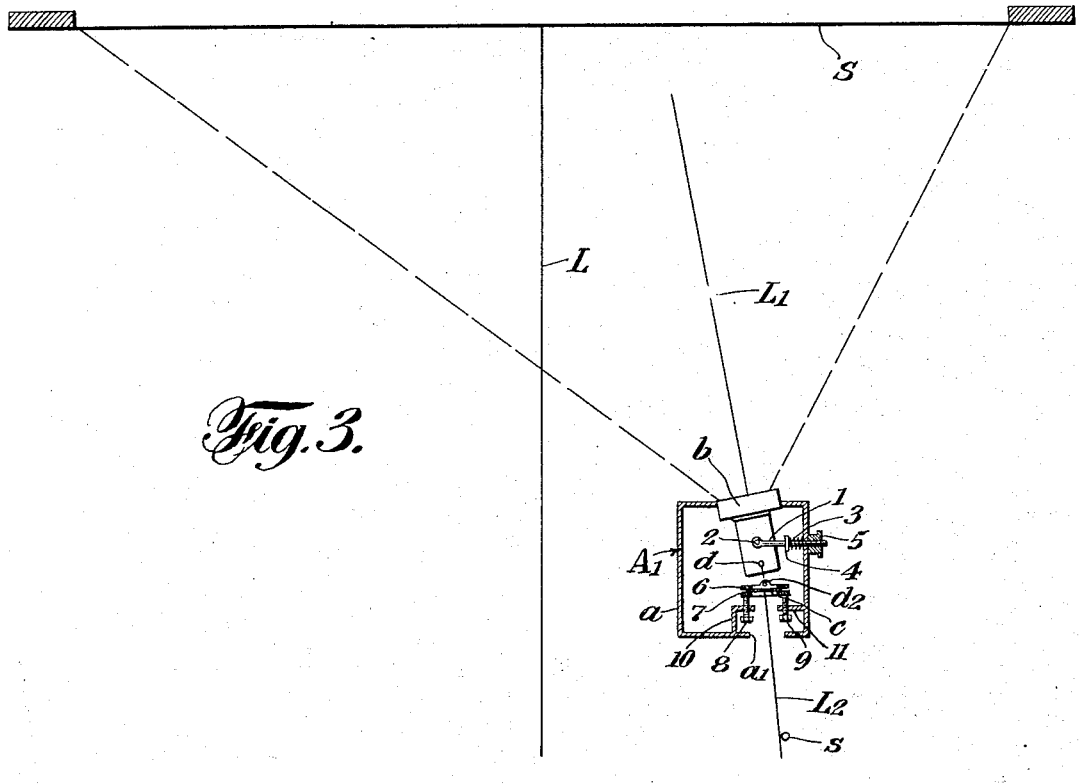
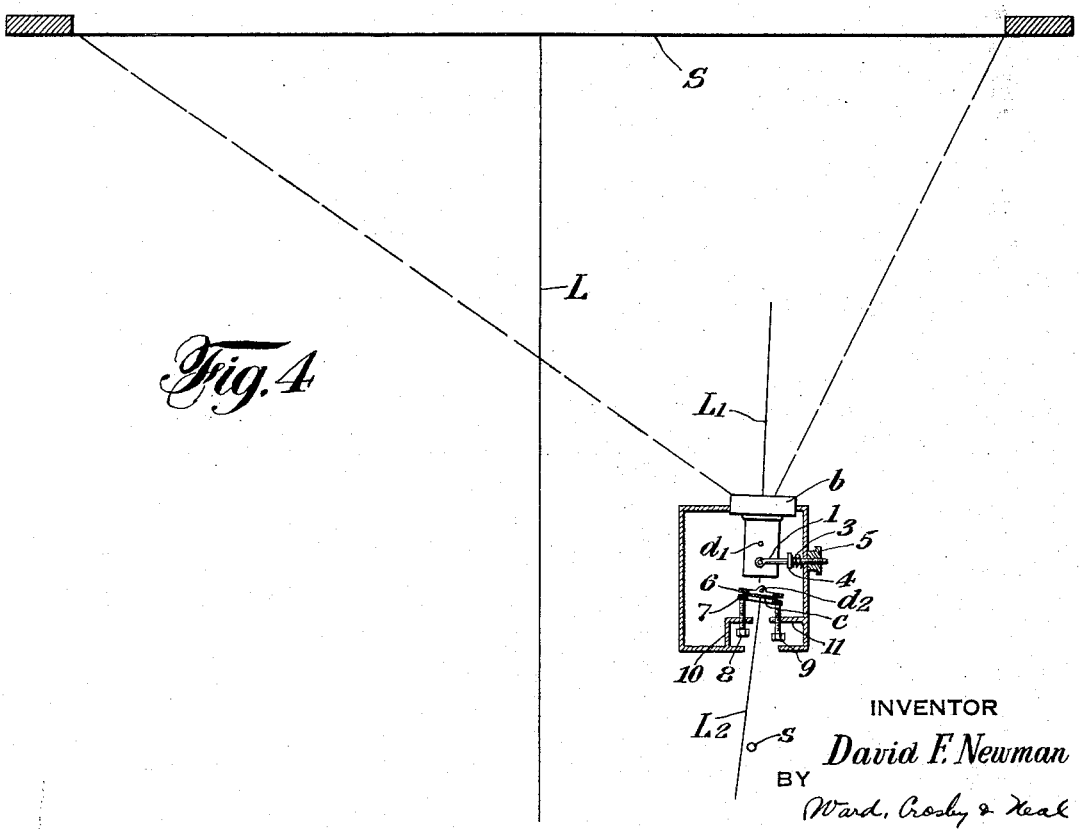
INVENTOR
David F. Newman
BY
Ward, Crosby & Neal
ATTORNEYS Patented Dec. 10, 1935

2,023,970

UNITED STATES PATENT OFFICE 2,023,970

PROJECTION SYSTEM AND METHOD

David F. Newman, Freeport, N. Y., assignor to Trans-Lux Daylight Picture Screen Corporation, New York, N. Y., a corporation of Delaware Application January 16, 1932, Serial No. 587,024

5 Claims. (Cl. 88—24)

My invention relates to the projection art and comprehends a method of and apparatus for obtaining satisfactory or commercial image representation on a screen.

In accordance with my invention, the objective lens of the projector, the film section in the projection field and, usually, the path of the projecting light beam are so adjusted and correlated as to obtain satisfactory focus of the projected image with little or no keystone distortion.

Further advantages, objects and characteristics of my invention will become apparent from the following description taken in connection with the accompanying drawings.

My invention resides in the system, method and features of the character hereinafter described and claimed.

For an understanding of my invention and for an illustration of some of the various phases thereof, reference is to be had to the accompanying drawings, in which:

Fig. 3 is a diagrammatic view of a rear projection system with the projector parts arranged in accordance with my invention; and Fig. 4 is a diagrammatic view of a rear projection system showing a preferred form of my invention.

Figures 1, 2:
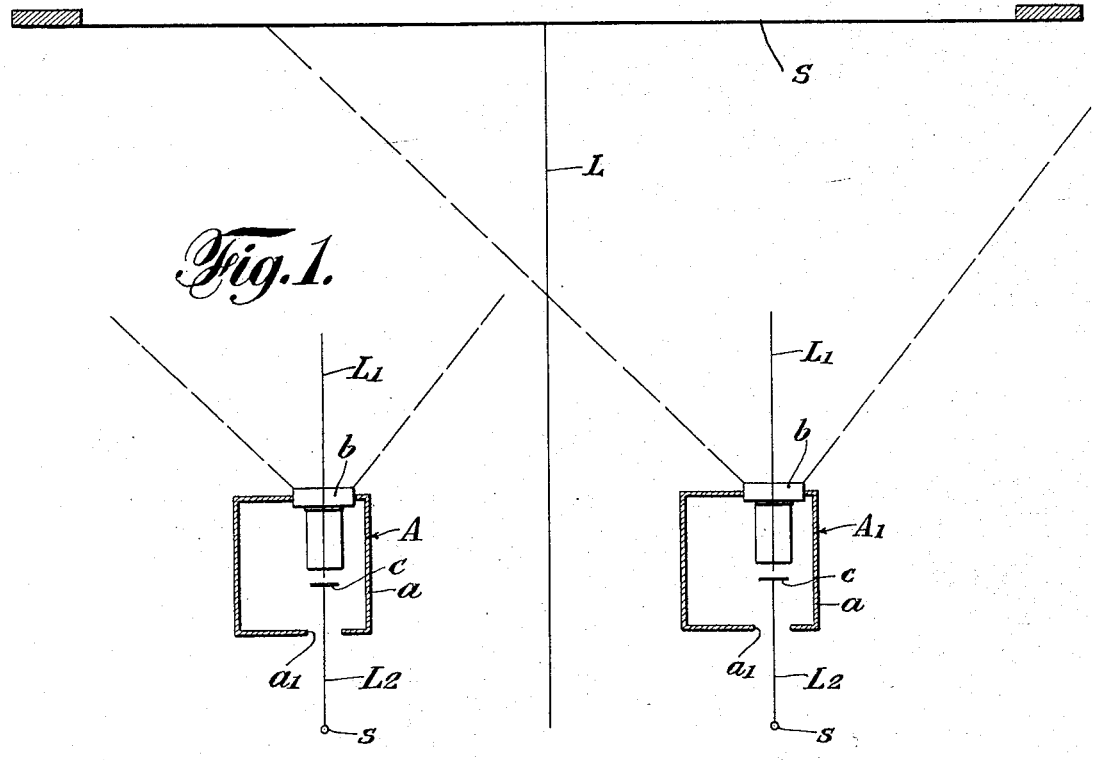
Figure 1 is a diagrammatic view of a rear projection system.
Fig. 2 is a diagrammatic view of the rear projection system of Fig. 1 in slightly modified form.

In rear projection systems for motion pictures, the projector is placed behind the screen and, accordingly, the projecting light beam passes through said screen in order to reach the observers. In the usual theatre, the auditorium area is large compared with the area behind the screen and, due to this condition, the "throw" of the projecting light beam, when rear projection is practiced, is necessarily substantially shorter than exists in front projection systems wherein the projector can usually be positioned at any desired distance in front of the screen. For continuous projection of pictures, it is well understood that at least a pair of projectors are required, said projectors being used alternately and, therefore, disposed at opposite sides, respectively, of the screen center line. Where the projectors are disposed relatively close to the screen as usually required in rear projection systems and on opposite sides of the screen center line as just stated, it results that there is keystone distortion and improper image focus unless special corrective measures are taken. Such corrective measures, in accordance with a preferred form of my invention, are hereinafter explained and described.

Referring to Fig. 1, S represents any suitable screen such, for example, as is suitable for rear projection purposes. Extending at right angles from the screen S is the screen center line L.

Disposed, respectively, at opposite sides of the center line L are the projectors A, A1, the distance between said projectors being sufficient to permit the attendant to perform his ordinary operating duties. As shown, although not necessarily, the projectors A, A1 are of similar kind and the operating mechanisms are duplicates of each other. Thus, as diagrammatically shown, each projector comprises a mechanism housing a, an objective or projection lens b, and a suitable film gate assembly, not shown, for guiding the motion picture film c along a path disposed substantially at right angles to the plane of the sheet of drawing paper. L1 represents the axis of the objective lens b and L2 is a line extending perpendicularly with respect to the center of any given film section while the latter is in the projection field of the projector. As shown, the lines L1 and L2 are in alinement or straight-line relation with respect to each other and are disposed parallel to the screen center line L. The housing a is apertured as indicated at a1 for the passage of the projecting light beam from the light source s. As illustrated in Fig. 1, the line L2 intersects said light source and, in a sense, the lines L1 and L2 may be termed the axis of the projecting light beam.

The projector mechanism parts and film are shown as arranged in Fig. 1 in substantially the normal relative positions which they occupy with respect to each other for ordinary front projection wherein a relatively long focus objective lens is used with the result that the distance between the screen and projector is relatively great. When the projectors are disposed relatively close to the screen as shown in Fig. 1, the objective lens b is of the short focus type such, for example, as disclosed in the copending Bowen applications Serial No. 316,403, filed Nov. 1, 1928 and Serial No. 420,937, filed Jan. 15, 1930, which has become Patent No. 1,863,099, dated June 14, 1932, and, under such circumstances, the projected image is of satisfactory character in that the focus is sharp and there is no keystone effect. However, as clearly appears in Fig. 1, a part of the image is in non-registering relation with respect to the screen S.

It might be assumed that the condition last noted could be overcome as shown in Fig. 2 by shifting the objective lens b toward the screen center line L while maintaining the two lines L1 and L2 substantially in parallel relation. It is true that the objective lens b may thus be shifted to such extent that the projected light area is brought into proper registering relation on the screen S, particularly if the light source s is shifted in opposite sense as shown in Fig. 2. However, if the distance between the two projectors is to be maintained at a desired distance sufficient to permit the attendant to move around and perform his duties, it results that lateral shift of the objective lens as described above so changes the prior existing relation that a part of that film picture frame in the projection field at any given time is no longer in the field of the objective lens. Under such circumstances, the resultant projected image shows only a part of the picture to be projected, this, of course, being an impractical operating condition.

In accordance with my invention, I overcome these difficulties incident to rear projection by certain novel relations effected between parts of the projector, whereby satisfactory projection is attained. Thus, as shown in Fig. 3, I have moved or partially rotated the objective lens b from its position as shown in Fig. 1 in a counter-clockwise direction about a vertical axis d near the rear of the lens until the projected image properly registers on the screen S. Next, the field end of the objective lens is brought into proper covering relation with respect to that film picture frame in the projection field at any given time and, accordingly, the entire projected image properly registers on the screen S. Further and of great importance, there is but little keystone distortion of the projected image.

However, if the path of the film c remains as shown in Fig. 1 wherein the line L2 is substantially parallel with the screen center line L, it results that partial rotative movement of the objective lens b as described above throws the projected image out of focus. To overcome this difficulty, I so adjust the aforesaid film gate assembly that the film traverses a new path which is partially rotated in a counter-clockwise direction from the corresponding film path of Fig. 1. This clearly appears in Fig. 3 where the line L2 which, as stated, extends perpendicularly with respect to the center of any given film section while the latter is in the projection field, is shown as no longer in substantially parallel relation with respect to the screen center line L. I have demonstrated in practice that adjustment of the film path as described brings the projected image back into a satisfactory focus condition and that such adjustment is not attended by any substantial increase of keystone distortion.

It will be observed that the lines L1 and L2, as shown in Fig. 3, are angularly related to the screen center line L and that said lines L1 and L2, to some extent, are angularly related to each other, this angular relation having been obtained by rotative change in the otherwise normal positions of the objective lens and the film gate assembly. This is a significant feature of my invention and, in such respects, departs from prior art practice.

In Fig. 3, it will be observed that the light source s has been shifted from the corresponding position shown in Fig. 1. Ordinarily, in accordance with my invention, change in position of the objective lens and film gate assembly as described above should be attended by change in direction of the axis of the projecting light beam. This may be accomplished by providing a suitable mounting for the lamp housing so that the latter may be pivotally adjusted with respect to the mechanism housing a. It shall be understood that no hard and fast rules are involved with respect to the direction to be taken by the projecting light beam. Thus, in Fig. 3, it is apparent that the axis thereof coincides with neither of the lines L1 and L2 although, obviously, it might coincide with one of said lines if desired.

In the form of my invention shown in Fig. 4, the projected image is brought into proper registration on the screen S by partially rotating the objective lens b clockwise from its Fig. 1 position about an axis d1 located near the front of the lens rather than the rear thereof as in the form of my invention shown in Fig. 3. By such clockwise partial rotation of the objective lens b to the position shown in Fig. 4 and slight lateral adjustment of the lens b until the field end of same is brought into proper covering relation with respect to the film picture frame in the projection field, the image area is brought into proper registration on the screen and there is but little keystone distortion. However, the described movement of the objective lens throws the projected image out of focus and, to overcome this difficulty, I so adjust the film gate assembly that the film traverses a new path which is partially rotated in a clockwise direction with respect to the corresponding film path of Fig. 1. This clearly appears in Fig. 4 wherein the line L2 is shown as angularly related to the screen center line L. The form of my invention illustrated in Fig. 4 has proven satisfactory in practice since, when the proper relation between the various parts is obtained, the projected image has but little keystone distortion and is properly focused.

With the form of my invention shown in Fig. 4 the axis of the projecting light beam should be suitably brought to some new relation different from that shown in Fig. 1 whereby a maximum or desired lighting effect is obtained on the screen.

In order to place an installation in condition for actual service, it is usually necessary that the objective lens and the film gate assembly be adjusted several times in order to obtain the best results. That is, a rough adjustment may first be secured and, with this as a basis, there may follow more accurate adjustments of the projection lens and the film gate assembly with respect to each other in order to obtain a projected picture of the desired character. Usually, the axis of the light beam is brought into its desired position after completion of the other adjustments.

Mechanism of any suitable form may be utilized for pivotally supporting the objective lens so that it may be adjusted in either of opposite directions as described in accordance with the different forms of my invention. Furthermore, a film gate assembly of any suitable type may be utilized for obtaining the desired angular relation of the film path or, with standard film gate assemblies, there may be associated suitable mechanism for obtaining the result last noted.

Thus, as diagrammatically illustrated in Figs. 3 and 4, the housing a is shown as having a threaded rod 1 freely extending through an opening in a wall thereof, said rod 1 being pivoted to the objective lens b as shown at 2. A helical spring 3 disposed around the rod 1 engages the inner surface of the housing wall and a member 4 projecting laterally from the member 1. Exteriorly of the housing a, the rod 1 carries a nut 5 which, when threaded forwardly on the rod 1, swings the objective lens b in a clockwise direction, Fig. 3, and a counter-clockwise direction, Fig. 4, and which, when threaded rearwardly on said rod 1, permits the spring 3 to swing the objective lens b in a counter-clockwise direction, Fig. 3, and a clockwise direction, Fig. 4. The film c is shown as movable between the members 6 and 7 of the film gate assembly, said members being separably secured together in any suitable manner, not shown, and pivoted as a unit about a vertical axis d2. Screws 8 and 9 threaded, respectively, in supporting members 10 and 11 carried by the housing a may be utilized in an obvious manner to swing the film gate assembly together with the film associated therewith in either a clockwise or counter-clockwise direction as desired.

It will be understood that the forms of my invention shown in Figs. 3 and 4 are diagrammatically complete only in so far as one projector is concerned. In actual practice, duplicate projectors are utilized and these are disposed on opposite sides of the screen center line L, the proper relation between parts of each being subsequently obtained so that the images from each register with substantially the same screen section.

Although my invention has been described in connection with rear projection systems, it shall be understood that, as regards some phases thereof, the invention is not to be so limited since certain features are applicable to front projection systems.

While the invention has been described with respect to certain particular preferred examples which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In a projection system comprising a projector positioned at one side of the center line of the screen and forming a non-registering image area with respect thereto when the projection lens is centered on the projection field with the projection lens axis perpendicular to the screen, the method which comprises imparting rotative movement to said objective lens with respect to the device which guides the film transversely through the projecting light beam whereby the image area is centered on said screen, and angularly adjusting said device with respect to the axis of said objective lens to secure focus of the projected image.

2. In a projection system comprising a projector positioned at one side of the center line of the screen and forming a non-registering image area with respect thereto when the projection lens is centered on the projection field with the projection lens axis perpendicular to the screen, the method which comprises imparting rotative movement to said objective lens with respect to the projector film path whereby the image area is centered on said screen, angularly adjusting said film path with respect to the axis of said objective lens to secure focus of the projected image, and angularly adjusting the axis of the projecting light beam with respect to the axis of said objective lens to obtain a desired degree of screen illumination.

3. In a projection system comprising a projector positioned at one side of the center line of the screen and forming a non-registering image area with respect thereto when the projection lens is centered on the projection field with the projection lens axis perpendicular to the screen, the method which comprises imparting rotative movement to said objective lens about substantially a vertical axis with respect to the device which guides the film transversely through the projecting light beam whereby the image area is centered on said screen, and angularly adjusting said device about substantially a vertical axis to secure focus of the projected image.

4. In a projection system comprising a projector positioned at one side of the center line of the screen and forming a non-registering image area with respect thereto when the projection lens is centered on the projection field with the projection lens axis perpendicular to the screen, the method which comprises imparting rotative movement to said objective lens about substantially a vertical axis with respect to the projector film path whereby the image area is centered on said screen, angularly adjusting said film path about substantially a vertical axis to secure focus of the projected image, and angularly adjusting the axis of the projecting light beam with respect to the axis of said objective lens to obtain a desired degree of screen illumination.

5. In a projection system comprising a projector positioned at one side of the center line of the screen and forming a non-registering image area with respect thereto when the projection lens is centered on the projection field with the projection lens axis perpendicular to the screen, the method which comprises imparting rotative movement to said objective lens with respect to the projector film path, moving said lens laterally to position the field end thereof in covering relation with respect to the projection field, and angularly adjusting said film path with respect to the axis of said objective lens to secure focus of the projected image.

DAVID F. NEWMAN.